United States Patent [19]

Turpin

[11] 4,156,667

[45] May 29, 1979

[54] AQUEOUS POLYESTER COATINGS

[75] Inventor: Edward T. Turpin, Elyria, Ohio

[73] Assignee: SCM Corporation, New York, N.Y.

[21] Appl. No.: 880,616

[22] Filed: Feb. 23, 1978

Related U.S. Application Data

[63] Continuation-in-part of Ser. No. 772,762, Feb. 28, 1977, abandoned.

[51] Int. Cl.² .............................................. C08L 61/28
[52] U.S. Cl. .......................... 260/29.4 UA; 204/181 R; 260/33.2 R; 427/388 C; 428/458; 428/460
[58] Field of Search .................. 260/29.4 R, 29.4 UA, 260/850, 33.2 R, 22 A, 851, 856; 428/458, 460

[56] References Cited

U.S. PATENT DOCUMENTS

| | | | |
|---|---|---|---|
| 3,355,408 | 11/1967 | Mayer | 260/29.6 |
| 3,396,209 | 8/1968 | Sekmakas et al. | 260/856 |
| 3,463,750 | 8/1969 | Ghosh | 260/22 |
| 3,959,201 | 5/1976 | Chang | 260/29.4 R |

*Primary Examiner*—Theodore E. Pertilla
*Attorney, Agent, or Firm*—Merton H. Douthitt; Jerry K. Mueller, Jr.

[57] ABSTRACT

Aqueous heat-curable coating compositions comprise polyester resin, aminoplast resin, and an allyl ether of a diol or triol wherein the allyl ether alcohol functions as a conventional co-solvent for aiding in dispersing the polyester resin in water and under curing conditions becomes an integral part of the cured coating.

22 Claims, No Drawings

AQUEOUS POLYESTER COATINGS

CROSS-REFERENCE TO RELATED APPLICATIONS

This application is a continuation-in-part of application U.S. Ser. No. 772,762, filed Feb. 28, 1977 now abandoned.

BACKGROUND OF THE INVENTION

The present invention relates water-thinnable thinnable polyester coatings and more particularly to suppression of solvent popping and elimination of volatile organic co-solvent in such coatings formulations.

It is known to formulate aqueous coatings of polyester resins and aminoplast cross-linking resins such as are described in U.S. Pat. No. 3,463,750. In such coatings, however, the polyester polymer typically can only be dispersed or diluted in water with the aid of volatile organic co-solvent. These co-solvents volatilize during heat-curing operations which can create pollution and cause solvent "pops" in the cured film. Also, such co-solvents lower the effective non-volatile solids content of the coatings which makes such coatings less efficient and economic in commercial use. In particular, U.S. Pat. No. 3,463,750 proposes water-thinnable polyester resins made from the condensation product of a polybasic acid (e.g. trimellitic acid), an unsaturated or saturated dibasic acid (e.g. maleic acid), a polyol (e.g. trimethylolpropane), and an allyl ether of a polyhydric alcohol having at least three hydroxyl groups (e.g. trimethylolpropane-diallyl ether). The coatings described in this citation require at least about 8 to 11% or more volatile organic co-solvent in the examples for adequately dispersing the polyester resin in water and stabilizing such polyester thereafter. Further on this citation can be found in the examples which follow.

The present invention substantially suppresses solvent popping in the cured film and can obviate the necessity of using such volatile organic co-solvents by providing a unique blend of a polyester resin with disclosed allyl ether alcohols which not only function as conventional co-solvents but also are cross-linkable into the coating upon subsequent curing operations. Higher non-volatile solids content, reduced pollution, and superior performance coatings are thereby obtained.

SUMMARY OF THE INVENTION

The instant water-thinnable, heat-curable coating composition comprises a polyester resin, a cross-linking amount of aminoplast resin, and an allylether alcohol as hereinafter defined. The coating may be substantially devoid of volatile organic co-solvent. In the manufacture of water-thinnable, heat-curable coating compositions of a polyester resin and aminoplast resin, the present invention is an improvement for substantially eliminating volatile organic co-solvent. This manufacturing improvement comprises blending an allylether alcohol with the polyester resin.

DETAILED DESCRIPTION OF THE INVENTION

The present coating composition is composed of three primary ingredients: polyester resin, aminoplast cross-linking resin, and allyl ether alcohol.

Referring now to the allyl ether alcohols, such compounds can be considered a reactive diluent or reactive co-solvent in that they function as a conventional organic co-solvent for reducing viscosity of the polyester resin for dispersal in water, improving pigment wetting when pigment is incorporated in the coating, improving can stability of the coating composition, and the like. Concomitantly, the allyl ether alcohol is part of the curable non-volatile solids content of the coating for cross-linking into the cured film for providing increased solids content of the coating for efficiency and economy and reduction of pollution. The allyl ether alcohols of this invention also can be relatively inexpensive in cost.

The allyl ether alcohols of this invention broadly are monoallyl ethers of diols or triols and diallyl ethers of triols represented by the following general structure:

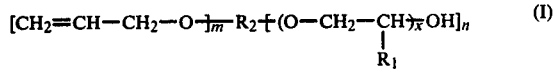

$$[CH_2=CH-CH_2-O]_m-R_2-[(O-CH_2-CH(R_1))_x OH]_n \quad (I)$$

where $R_1$ is a hydrogen or a methyl group; and
$R_2$ is a divalent or trivalent hydrocarbon group and
  m = 1 or 2
  n = 1 or 2
  (n) (x) = 1–18, inclusive, or
$R_2$ is a divalent polyoxyalkylene radical represented by the general structure

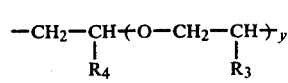

$$-CH_2-CH(R_4)-[O-CH_2-CH(R_3)]_y-$$

where
$R_3$ and $R_4$ independently are hydrogen or a methyl group,
m = 1
n = 1
x + y = 2–18, inclusive, and where the molecular weight of the allyl ether alcohol ranges up to about 1200, generally between about 200 and 1200, and preferably between about 300 and 700.

In order to minimize volatility of the allylether alcohols and suppress concomitant toxicity problems, higher molecular weight allylether alcohols may be preferred (eg. MW above 500 and typically about 500 to 1000). Thus, low boiling compounds in mono-allylether alcohols desirably can be purged before incorporation of the mono-allylether alcohol into the present coating composition (eg. by distillation or the like). Diallylether alcohols utilize higher molecular weight reactants typically and, thus, the need for removal of low boiling compounds therefrom is lessened.

The allyl ether composition represented in formula I can be prepared, for example, by the reaction of an alkylene oxide with allyl alcohol at temperatures of about 20° to 100° C. in the presence of a Lewis acid catalyst. Preferred allyl ether alcohols for use in the present coating composition include: pentapropyleneglycol monoallylether, hexaethyleneglycol monoallylether, polyethyleneglycol monoallylether, polyoxypropylene trimethylolpropane diallylether, polyoxypropylene trimethylolpropane monoallylether, and the like.

Referring now to the polyester resin, such resin is the product obtained by condensing: (A) polyol or mixture of polyols including hydroxyl precursors such as oxiranes or the like, and (B) polybasic acid or corresponding anhydride having at least two carboxyl groups for providing good water dispersibility of the polyester resin. The basic constraints placed on the polyester resins are that they are water-dispersible by forming water-soluble salts from their carboxyl groups and they contain sufficient hydroxyl and/or carboxyl groups for cross-linking with the aminoplast cross-linking resins for cure of the coating. Advantageously, the polybasic acid (B) component of the polyester resin is an unsaturated dibasic acid. Alternatively, the polybasic acid can comprise a mixture of unsaturated dibasic acid and saturated polybasic acid having at least two carboxyl groups. Typically, the unsaturated dibasic acid will predominate in such mixture of acids (e.g. molar ratio of unsaturated dibasic acid to saturated polybasic acid of less than about 10). Of course, a variety of other conventional ingredients may be incorporated into the polyester resin as is necessary or desirable.

The polyester resin can be made by conventional polyesterification condensation techniques as are well known in the art. While the ratios of the starting materials can vary greatly, generally the molar ratio of A to B is between about 0.5 and about 2 and preferably between about 1 and 1.5. The ratio of hydroxyl to carboxyl groups in the starting materials more often is between about 0.3 and 2, and most often between about 1 and 1.5, but these figures can vary substantially. The acid number of the polyester resin should be below 100 (milligrams potassium hydroxide) and preferably between about 30 and 70 for providing good water dispersibility of the resin and assisting in catalyzing the aminoplast cure of the coating.

Representative polyols for use in formulating the instant polyester resins include ethylene glycol, propylene glycol, butylene glycol and similar alkylene glycols, glycerol, trimethylol ethane, 1,4-cyclohexanedimethanol, trimethylolpropane, pentaerythritol, and polyether polyols such as dipropylene glycol, polyoxypropylene diols and triols and the like and mixtures thereof. Representative dibasic acids (including their corresponding anhydrides for present purposes) include the acids: succinic, glutaric, adipic, maleic, fumaric, ortho-phthalic, iso-phthalic, 5-norborene-2,3-dicarboxylic acid and the like and mixtures thereof. Preferably at least one of the dibasic acids included in the formulation of polyester resin is an alpha,-beta-ethylenically unsaturated dibasic acid such as, for example, maleic acid or fumaric acid. Representative polybasic acids having at least three carboxyl groups per molecule include, for example, trimellitic acid, hemimellitic acid, pyromellitic acid and the like and mixtures thereof.

Referring now to the aminoplast cross-linking resins, the aminoplast resins employed herein are aldehyde condensation products of melamine, urea, benzoguanamine and the like. Preferably such aminoplast resins are water-soluble. Generally, the aldehyde employed is formaldehyde, although useful products can be made from other aldehydes such as acetaldehyde, crotonaldehyde, acrolein, benzaldehyde, furfural and the like. Condensation products of melamine, urea, and benzoguanamine are the most common and are preferred, or products of other amines and amides in which at least one amino group is present also can be employed. The aminoplast resins are readily available in the market place and such commercially marketed aminoplasts are quite suitable for the instant invention.

Such condensation products can be produced from triazines, diazines, triazoles, guanadines, guanamines and alkyl- and aryl-substitutes derived of such compounds, including alkyl-substituted, aryl-substituted, and cyclic ureas, and alkyl- and aryl-substituted melamines. Some examples of such compounds are N,N-dimethyl urea, benzyl urea, N,N'-ethylene urea, diazine diamide, formaguanamine, acetoguanamine, ammeline, 2-chloro-4,6-diamino-1,3,5-triazine, 3,5-diaminotriazole, 2,4,6-triphenyltriamino-1,3,5-triazine, and the like.

These aldehyde condensation products may contain methylol groups or similar groups, depending on the particular aldehyde employed. Ordinarily, in producing amine-aldehyde condensation products, all or part of these methylol groups are etherified by reaction with an alcohol to produce an alkylated product. In some instances, it is desirable that all or substantially all of the methylol groups be etherified. Various alcohols can employed for the etherification of the alkylol groups. These include essentially any monohydric alcohol, with the preferred alcohols being methanol, ethanol, propanol, butanol, and other lower alkanols having up to about 5 carbon atoms, including isomers such as 2-methyl-1-propenol. There can also be employed alcohol such as the lower alkyl mono-ethers of ethylene glycol and the like. While higher alcohols can be used, they are less desirable because of their tendency to affect the film properties of the cured film and their recalcitrance towards water-dispersibility.

In practicing this invention, the allyl ether alcohol is blended with the polyester resin for providing the requisite viscosity of polyester resin for incorporation in water. The weight ratio of polyester resin to allyl ether alcohol broadly ranges from about 0.5 to 15. Within this range, there is substantially no volatile organic cosolvent required for reducing the polyester in water nor for providing storage or can stability of the coating. For present purposes, substantially no volatile organic co-solvent (or substantially devoid of volatile organic co-solvent) means that the coating composition contains not in excess of about 5% by weight of said cosolvent. The weight ratio of polyester resin to allyl ether alcohol in this embodiment advantageously is about 1:1 to 10:1 and preferably about 2:1 to 7:1. Reduced solvent emission during curing operations is a decided benefit of the invention when the coating composition contains substantially no volatile organic cosolvent.

A measure of such solvent volatilization is known as the "Relative Solvent Emission" (RSE), and is defined as the percentage of organic volatiles emitted from the coating during curing based on the weight of the coating resin solids which form the cured coating. The following formula shows the calculation of the Relative Solvent Emission as will be used in this case and in the examples which follow:

$$RSE = 100\% \times \frac{\text{Aminoplast Volatiles + Amine Agent Volatiles + Organic co-solvent (by weight)}}{\text{Film-Forming Solids of the Coating (by weight)}} \quad (V)$$

As displayed in the foregoing formula, the organic volatiles normally found in the coating are the amine neutralizing agent used to neutralize polyester resin, organic co-solvents used in the composition, and a portion of the aminoplast resin which is displaced from the aminoplast during the curing and is volatilized thereafter. For example, when the aminoplast resin is hexamethoxymethylmelamine, it is assumed that approximately 20% by weight of the aminoplast in the form of chemically displaced methanol occurs and such loss forms part of the solvent emission for calculating the RSE of a coating. The coating composition of the present invention can provide RSE value as low as 7 to 8% while maintaining superior performance properties of the cured coating.

Though reduced organic cosolvent and low RSE values are decided features of the invention, the instant allyl ether alcohols perform another valuable function in the coating even when conventional amounts of volatile organic cosolvent are used in the coating. Thus, when organic cosolvent is the principal ingredient employed for reducing the polyester in water, such cosolvent can cause solvent popping in the cured coating. Solvent popping is the result of heat curing the coating whereby the cosolvent is volatilized from the film to leave pops or blisters which are imperfections in the cured film detracting from appearance and effective protection for the coated substrate. Use of the allyl ether alcohols in such instances, wherein the weight ratio of polyester resin to allyl ether alcohol is less than about 9:1, substantially precludes solvent popping in the cured film even though substantial amounts of volatile organic cosolvent are contained in the coating. Desirably, then, such weight ratio should be between about 0.5:1 and 9:1 and preferably between about 5:1 and 9:1 when electrostatic spraying techniques are used to apply the coating on a substrate.

Polyester resin in the blend then can be neutralized with an amino compound or amine neutralizing (ionizing) agent for providing water thinnability or dispersiblity of the polyester resin. Suitable volatile amine agents include those traditionally used in the art, such as, for example, ammonia, triethylamine, dimethylethanolamine, monoethanolamine, diisopropanolamine, and the like and mixtures thereof. The quantity of amine agent, preferably an alkanolamine, can be more or less than that theoretically required for complete neutralization of polyester resin and such quantity normally ranges between about 70% and 130% of the theoretical amount. The neutralized polyester resin blended with allyl ether alcohol then is dispersed in water to a non-volatile solids content of up to 40 to 50% or higher followed by addition of the aminoplast cross-linking resin thereto. Also, suitable pigments and other conventional additives can be added to the coating composition.

The coating composition can be applied to a substrate, preferably metal, by conventional techniques such as spraying, dipping, reverse roll coat, direct roll coat, brushing, and the like. The coating composition is especially adapted for spray application by conventional hand spraying and electrostatic spraying techniques as shown in the Examples which follow. For application of the coating composition by hand spraying the viscosity of the coating desirably is between about 30 and 50 seconds as measured by a No. 4 Ford cup (ASTM D-1200, Vol. 27, 1976). For application by electrostatic spraying techniques, such viscosity desirably is between about 26 and 30 seconds, preferably about 28 seconds, as measured by a No. 2 Zahn cup.

The coated substrate then is baked at a temperature of from about 120° to 300° C. for about 5 to 40 minutes to cure the film. The coating composition cures by the aminoplast cross-linking resin cross-linking with the hydroxyl and/or carboxyl groups of the polyester resin. Generally, no catalysts are required to promote this reaction as the carboxyl groups on the polyester effectively self-catalyze the aminoplast/hydroxyl reaction.

Also, the aminoplast resin can link with the hydroxyl groups of the allyl ether alcohol. If a saturated polyester is contained in the coating composition, then the allyl groups of the allyl ether alcohol will cross-link upon baking to form an allyl ether homopolymer which can be linked into the coating by the aminoplast resin reacting with the hydroxyl groups of such homopolymer. Preferably, though, an ethylenically unsaturated polyester is incorporated into the coating composition for additional reaction of the allyl groups wtih the saturation of such polyester. This reaction is more efficient and is obtained faster than the allyl-allyl cure and tends to minimize the tendency of the allyl-allyl homopolymer formation to cause surface wrinkling of the cured film. Thus, mono-allyl ether alcohols are preferred for use with saturated polyesters, while mono-, and di-allyl ether alcohols may be used with unsaturated polyesters.

The following examples show in detail how the present invention can be practiced but should not be construed as limiting. In this application, all percentages are weight percentages and all temperatures are in degrees Centigrade, unless otherwise expressly indicated.

EXAMPLE 1

A mono-allylether glycol was prepared by heating 58 grams of allyl alcohol with 1.5 grams of a boron trifluoride-diethylether complex to 50° C. During a 4 hour period 290 grams of propylene oxide was added thereto while maintaining a batch temperature of 50°–70° C. Finally, an additional 0.2 grams of the boron trifluoride ether complex was added and the batch maintained for another two hours at 50°–70° C. The allylether alcohol product had the following parameters from Structure I above: $R_1=CH_3$, $m=1$, $n=1$, $x+y=4$, $R_3=CH_3$, and $R_4=CH_3$. ($R_2$ being a divalent polyoxyalkylene radical).

EXAMPLE 2

A di-allyl ether of a triol was prepared from 1238 grams of trimethylolpropane di-allylether (5.78 moles of TMPDAE) and 2682 grams of propylene oxide (46.2 moles of PO) by separately adding PO and 15 grams of BF$_3$-etherate complex to the TMPDAE in a pot held at 50°–60° C. over a three hour period. An additional 8 grams of the complex then was added over a 1 hour period until the reaction mixture analyzed less than 0.1% PO (by GC analysis). The crude diallylether alcohol product then was washed twice with 1000 cc. portions of water (at 80° C.) and the product distilled at a temperature up to 175° C. under a nitrogen sparge.

The final di-allylether alcohol product had a viscosity of 88 centipoises, an acid number of 0.7 (mg KOH per gram of product), an allyl equivalent weight of 339 (calculated), a hydroxy equivalent weight of 678 (calculated), and a calculated molecular weight of 678. The parameters of Structure I above for the product were: $R_1=CH_3$, $R_2=$trivalent hydrocarbon radical, $m=2$, $n=1$, and $(n)(x)=8$.

EXAMPLE 3

A mono-allylether of a triol was prepared from 1218 grams of TMPMAE, 3248 grams of PO, and 22 grams of BF$_3$-etherate complex. The reaction procedure was similar to the procedure reported in Example 2, except that there was only the first addition of the complex and the product was distilled from 1000 gms of toluene. The final constants of the product were a viscosity of 152 cps, an acid number of 0.5, an allyl equivalent weight of 638, a hydroxy equivalent weight of 319, and a molecular weight of 638. The parameters from Structure I for the product were: $R_1=CH_3$, $R_2$ is a trivalent hydrocarbon group, $m=1$, $n=2$, and $(n)(x)=8$.

EXAMPLE 4

An unsaturated polyester was prepared by first reacting 1008 parts by weight (pbw) of 1,4-cyclohexanedimethanol and 441 pbw of maleic anhydride under a nitrogen blanket from an initial temperature of 150° C. up to a final temperature of 210° C. until an acid number of 3-4 was reached. The batch was cooled to 170° C. and to it was added 288 pbw of trimellitic anhydride. The reaction was allowed to run at 160°-165° C. with a nitrogen sparge until an acid number of 60 was reached for the final unsaturated polyester resin product.

The polyester resin was blended with 543 pbw of the allylether alcohol of Example 1 to give a 3:1 weight ratio of polyester resin to allylether alcohol. The aqueous coating composition was made by neutralizing the resinous blend with 152 pbw of dimethylethanolamine and then adding 875 pbw of hexamethoxymethylmelamine resin (HMMM) and 4418 pbw of deionized water. The coating composition had a non-volatiles solids content of 40% and a viscosity of 1 poise at room temperature. The coating composition had an RSE of 11.39%.

The coating composition was applied onto a cold rolled steel panel and baked at 140° C. for 20 minutes to give a hard, clear, mar-resistant, flexible, glossy film which was free of blisters, wrinkles, and other surface irregularities.

EXAMPLE 5

An unsaturated polyester was prepared in the manner described in Example 4 from the following listed ingredients: 1,4-cyclohexanedimethanol (878 pbw), maleic anhydride (157 pbw), ortho-phthalic anhydride (348 pbw), and trimellitic anhydride (250 pbw). The polyester was blended with 385 pbw of the allylether alcohol of Example 1 at a (4:1 weight ratio), neutralized with 147 pbw of dimethylethanolamine, and blended with 770 pbw of HMMM and 3894 pbw of deionized water. This coating composition had a 40% non-volatiles solids content, a viscosity of 1.2 poise at room temperature, and an RSE of 11.9%. This coating composition is especially adopted for spray application.

This coating composition was sprayed onto cold rolled steel panels at an 8 mil wet film thickness and baked at 140° C. for 20 minutes. The resulting cured coating had a pencil hardness of H, showed no signs of failure to a conical mandrel flexibility test, had a direct and indirect impact resistance of 120 inch-pounds for each, and withstood 300 methyl ethyl ketone rubs before slightly softening.

EXAMPLE 6

A comparative polyester resin was formulated in accordance with the teachings of U.S. Pat. No. 3,463,750 from the following ingredients: trimethylolpropane-mono-allylether (156 pbw), 1,4-cyclohexanedimethanol (749 pbw), ortho-phthalic anhydride (392 pbw), maleic anhydride (127 pbw), hydroquinone (0.1 pbw) and trimellitic anhydride (250 pbw). The reaction procedure was substantially the same as in the previous examples.

Extreme difficulty was encountered in neutralizing the polyester and dispersing it in water without the aid of volatile organic co-solvents. Certainly, commercial scale practice of this is infeasible. The best method determined for dispersing the unsaturated-allylether functional-polyester in water was to finely grind the polyester and slowly add the powder to amine and water at 20°-30° C. under agitation. It took 8 hours for the polyester to fully disperse in the water. The final coating composition contained polyester resin (200 pbw), dimethylethanolamine (20 pbw), HMMM (78 pbw), and deionized water (397 pbw). The coating composition had a 40% non-volatiles solids content and a viscosity of 730 poise at room temperature.

This comparative coating formulation was compounded into five different lots by the addition of water and volatile organic co-solvent until a viscosity comparable to the inventive coating of Example 5 was achieved. The following table depicts the inventive coating described in Example 5 and each of the five variations (Examples 6a to 6e) of the comparative formulation.

TABLE II

| Formulation | Non-Volatiles Solids (wt. %) | Viscosity Poise | EGMBE* (wt. %) | RSE (%) |
|---|---|---|---|---|
| Ex. 5 | 40 | 1.2 | — | 11.9 |
| Ex. 6a | 40 | 730 | — | 13.8 |
| Ex. 6b | 38 | 12 | — | 13.7 |
| Ex. 6c | 36 | 1.7 | — | 13.8 |
| Ex. 6d | 36 | 82 | 10 | 43.4 |
| Ex. 6e | 30 | 1.5 | 8.3 | 43.1 |

*Ethylene glycol mono-butyl ether

All coatings were hand sprayed onto cold rolled steel panels and baked at 140° C. for 20 minutes. The coatings of Examples 6a, 6b, and 6c were subject to severe solvent popping during curing. Incorporation of some EGMBE volatile organic co-solvent into the coating of Example 6d eliminated the popping problem, but dramatically increased the RSE. The viscosity of the 6d coating also was a bit high. More importantly, though, the non-volatiles solids content of the 6d coating is approaching unacceptably low levels. The 6e coating while providing an acceptable viscosity level, was too low in non-volatiles solids content for commercial use and had an RSE almost 4 times that of the Example 5 coating of this invention. The coating compositions of this invention as typified by the coating composition of Example 5 are especially adapted to be applied by conventional spray techniques and the foregoing viscosity comparison is based on suitability of the coatings for hand spray application.

EXAMPLE 7

An opacified paint was formulated from the coating composition of Example 5 in accordance with the following procedure. A pigment concentrate was prepared by blending 165 parts of the coating composition of Example 5, 35 parts of deionized water and 600 parts of titanium dioxide opacifying pigment (TI-PURE* R-900). The concentrate was reduced to the finished paint by the addition of 1710 parts of the coating composition of Example 5. The paint had a non-volatiles solids content of 53.8%, a viscosity of 32 seconds as measured by No. 4 Ford Cup, a pigment to film-forming binder ratio of 0.8, and an RSE value (not including the pigment) of 11.9%. When applied to a zinc-phosphated steel panel and baked at 140° C. for 20 minutes, the paint exhibited performance properties similar to the coating of Example 5, and also had a gloss of 84 (60° head) and 53 (20° head). No solvent popping was evident even at the edges of the paint film where film thickness was about 2.0 mils.
*TI-PURE is a registered trademark of E. I. duPont de Nemours & Co., Wilmington, Del.

EXAMPLE 8

A mono-allyl ether of polyethylene glycol was prepared by heating allyl alcohol (58 pbw) and boron trifluoride diethyl ether complex (1.5 pbw) to 50° C. followed by the addition of gaseous ethylene oxide (264 pbw) over a 6 hour period while maintaining a reaction temperature of 50°-55° C. Finally an additional 0.5 pbw of the ether complex was added and the batch maintained for an additional 2 hours at 55° C. The allyl ether alcohol product had the following parameters from Structure I above: $R_1=H$, $R_3=H$, $m=1$, $n=1$, and $x+y=5$ ($R_2$ being a divalent polyoxyalkylene radical.)

A polyester resin was prepared by reacting the following ingredients under nitrogen blanket: 1,4-cyclohexanedimethanol (1080 pbw), tetra-ethylene glycol (582 pbw), maleic anhydride (441 pbw), ortho-phthalic anhydride (666 pbw), and hydroquinone (0.5 pbw added as an oxidation inhibitor). A conventional condensation reaction was run at a maximum temperature of 210° C. until an acid number of 14 (mg. KOH per gm.) was reached.

The batch was cooled under a nitrogen blanket to 150° C. and to it was added 434 pbw of the mono-allyl ether of polyethylene glycol described above (a 6:1 weight ratio of polyester resin to allyl ether alcohol). The aqueous coating composition was made by neutralizing this resinous blend with 58 pbw of dimethylethanolamine and adding 912 pbw of hexamethoxymethylmelamine cross-linker and 5170 pbw deionized water to the neutralized resinous blend. The coating composition was a stable, slightly opalescent solution which was not subject to phase separation upon standing. The coating composition had a non-volatile solids content of 43%, a viscosity of 0.8 poise, and an RSE value of 6.4%.

The coating composition was sprayed onto steel panels and baked at 140° C. for 20 minutes. The cured film had a pencil hardness of F-H, withstood both a 160 in.-lb. reverse impact and a 160 in.-lb. direct impact without cracking, and withstood 200 methyl ethyl ketone double rubs before slightly softening. There was no indication of solvent blistering of the film.

EXAMPLE 9

A polyester resin was prepared from 1,4-cyclohexanedimethanol (2815 pbw), maleic anhydride (1278 pbw), dicyclopentadiene (DCPD, 669 pbw), and trimellitic anhydride (TMA, 836 pbw). The reaction procedure was the same as the procedure reported in Example I, except that the DCPD was reacted with maleic ester at 190°-195° C. for 1.5 hours prior to the addition of the TMA. When the polyester resin reached an acid number of 55±2, it was cut with the diallylether alcohol of Example 2 (800 pbw) and n-butanol (2086 pbw). The final resin solids had an acid number of 48±2 and a non-volatile solids content of 75% by weight.

The polyester resin/diallylether alcohol ratio was 7/1, thus, the addition of the organic cosolvent was deemed desirable in order to obtain a workable viscosity of the resin mixture. Nevertheless, when the polyester resin/diallylether alcohol mixture was incorporated with an aminoplast cross-linker and the coating heat-cured on a metal substrate, no solvent popping was evident at an RSE value of 35%. The same coating composition with the di-allylether alcohol being replaced with either n-butanol or EGMBE, however, evidenced solvent popping in the cured coating and had RSE values up to 60%. Thus, the benefits of using the instant allylether alcohols were clearly evident even though volatile organic cosolvent was present in the final coating composition.

EXAMPLE 10

A white pigmented paint was formulated from the polyester resin/diallylether alcohol blend of Example 9 as follows. First, a pigment concentrate was prepared by grinding the following ingredients in a Cowles mill to a Hagmann grind of 7.5:

| | |
|---|---|
| Polyester resin/di-allylether alcohol blend of Example 9 | 65.5 pbw |
| dimethylethanolamine | 4.0 pbw |
| deionized water | 87.5 pbw |
| TiO$_2$ (rutile form by the chloride process) *Zopaque RCL-9 TiO$_2$ | 246.0 pbw |

*Zopaque is a registered trademark of SCM Corporation, New York City, New York.

To the foregoing pigment concentrate grind was added the following premixed ingredients:

| | |
|---|---|
| Polyester resin (di-allylether alcohol blend of Example 9) | 197.0 pbw |
| HMMM (*Cymel 303) | 76.5 pbw |
| Isopropanol | 16.0 pbw |
| dimethylethanolamine | 11.0 pbw |
| deionized water | 318.8 pbw |
| UC L-7064 (anti-cratering agent of Union Carbide Corporation) | 0.5 pbw |
| EGMBE | 4.5 pbw |

*Cymel being a registered trademark of American Cyanamid Co.

The final paint had non-volatiles solids content of 50.1% by weight, a pigment to binder weight ratio of 0.898/1, and an RSE value of 42.5% (excluding pigment). The paint was sprayed onto zinc-phosphated steel panels at a film thickness of about 1.5 mils and baked at about 140° C. (285° F.) for 20 minutes to fully cure the applied paint film. The cured paint had the following performance properties:

| | |
|---|---|
| Solvent Popping at 1.5 mil | NONE |
| Pencil Hardness | 2H |
| Flexibility | Passes Conical Mandrel Test |
| Impact Resistance | |
| Direct | 160 in.-lb. |
| Indirect | 160 in.-lb. |
| Gloss | |
| 60° head | 83 |
| 20° head | 69 |
| Cross-Hatch Adhesion Test | Passes |

This paint is excellent for application onto metal desks, metal desk chairs, lawn mowers, and a wide variety of other articles of commerce.

EXAMPLE 11

In order to demonstrate the effect of the allylether alcohol in suppressing solvent popping, six samples of the polyester resin/diallylether alcohol mixture of Example 9 were compounded from the ingredients and in the manner of Example 9, except for the diallylether alcohol and organic cosolvent which were used as follows:

| SAMPLE NO. | DIALLYLETHER ALCOHOL (pbw) | ORGANIC COSOLVENT (NAME - pbw) |
|---|---|---|
| 1 | 800 | n-butanol-2086 |
| 2 | — | n-butanol-2886 |
| 3 | 800 | isopropanol-2086 |
| 4 | — | isopropanol-2886 |
| 5 | 800 | EGMBE-2086 |
| 6 | — | EGMBE-2886 |

All samples were reduced with water to a viscosity of 28 seconds as measured by a No. 2 Zahn Cup and applied by an electrostatic disc to 24 gauge phosphated steel panels. The coated panels were placed immediately (i.e. about 1 minute after application) in an oven held at about 149° C. (300° F.) and baked for 20 minutes. The baked panels then were removed from the oven and closely inspected for solvent "pops" and the film thickness recorded. Results of these tests are given below:

| SAMPLE NO. | FILM THICKNESS (mils) | SOLVENT POPPING (YES/NO) |
|---|---|---|
| 1 | 1.3 | NO |
| 2 | 1.2 | YES |
| 3 | 1.2 | NO |
| 4 | 1.1 | YES |
| 5 | 1.2 | NO |
| 6 | 1.2 | YES |

The foregoing results clearly show that at about the same film thickness only the coatings (samples nos. 1, 3, and 5) containing the diallylether alcohol displayed no evidence of solvent popping, while those coatings (samples nos. 2, 4, and 6) containing only organic cosolvent displayed solvent "pops".

I claim:

1. A water-dispersed, heat-curable coating composition comprising in aqueous dispersion:
I. the condensation product obtained by reacting
   a. a polyol; and
   b. a polybasic acid having at least two carboxyl groups;
II. a cross-linking amount of aminoplast resin; and
III. a compound represented by the structure

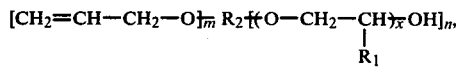

$$[CH_2=CH-CH_2-O]_m\, R_2 \rlap{-}{(}O-CH_2-\underset{R_1}{CH})_x OH]_n,$$

where
$R_1$ is hydrogen or a methyl group; and
$R_2$ is a divalent or trivalent hydrocarbon group; and
m = 1 or 2
n = 1 or 2
(n)(x) = 1–18, inclusive, or
$R_2$ is a divalent polyoxyalkylene group of the structure

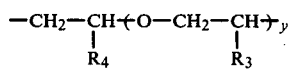

$$-CH_2-\underset{R_4}{CH}\rlap{-}{(}O-CH_2-\underset{R_3}{CH})_y$$

where $R_3$ and $R_4$, independently, are hydrogen or a methyl group,
m = 1
n = 1
x + y = 2–18, inclusive, and said compound having a molecular weight of up to about 1,200;
the weight ratio of (I) to (III) being from about 0.5:1 to 15:1, provided that when said weight ratio is greater than about 9:1, said composition contains substantially no volatile organic cosolvent.

2. The coating composition of claim 1 wherein for said condensation product (I) the molar ratio of a/b is between about 0.5 and 2.

3. The coating composition of claim 1 wherein said polybasic acid (b) is an unsaturated dibasic acid.

4. The coating composition of claim 1 wherein said polybasic acid (b) is a mixture of an unsaturated dibasic acid and a saturated polybasic acid having at least two carboxyl groups.

5. The coating composition of claim 1 wherein said weight ratio of said condensation product (I) to said compound (III) is between about 0.5:1 to 15:1 and said composition contains substantially no volatile organic cosolvent.

6. The coating composition of claim 4 wherein said weight ratio is between about 1:1 and 10:1.

7. The coating compositon of claim 6 wherein said weight ratio is between about 2:1 and 7:1.

8. The coating composition of claim 5 wherein said composition contains by weight about 50% to 60% water and has a viscosity of about 30 to 50 seconds as measured by a No. 4 Ford cup.

9. The coating composition of claim 1 wherein said weight ratio is between about 0.5:1 and 9:1 and said composition contains greater than 5% volatile organic cosolvent by weight.

10. The coating composition of claim 9 wherein said weight ratio is between about 5:1 and 9:1.

11. The coating composition of claim 10 which has a viscosity of between about 26 and 30 seconds as measured by a No. 2 Zahn cup.

12. The coating composition of claim 1 which is heat curable at a temperature of between about 120° and 300° C.

13. The coating composition of claim 1 wherein said compound (III) is the reaction product of allyl alcohol and propylene oxide, and $R_1$ is a methyl group, $R_2$ is a divalent polyoxyalkylene group, $R_3$ is a methyl group, $R_4$ is a methyl group, m = 1, n = 1, and x + y = 4.

14. The coating composition of claim 1 wherein said compound (III) is the reaction product of trimethylolpropane diallyl ether and propylene oxide, and $R_1$ is a methyl group, $R_2$ is a trivalent hydrocarbon group, m = 2, n = 1, (n)(x) = 8, and said compound has a molecular weight of about 650 to 710.

15. The coating composition of claim 1 wherein said compound (III) is the reaction product of trimethylolpropane monoallyl ether and propylene oxide having a molecular weight of about 620 to 660, wherein $R_1$ is a methyl group, $R_2$ is a trivalent hydrocarbon group, m = 1, n = 2, and (n)(x) = 8.

16. The coating composition of claim 1 wherein said compound (III) is the reaction product of allyl alcohol and ethylene oxide wherein $R_1$ is hydrogen, $R_2$ is a divalent polyoxyalkylene group, $R_3$ is hydrogen, $R_4$ is hydrogen, m = 1, n = 1, and x + y = 5.

17. The coating composition of claim 4 wherein condensation product (I) is obtained by reacting 1,4-cyclohexanedimethanol, maleic anhydride, and trimellitic anhydride.

18. The coating composition of claim 4 wherein said condensation product (I) is obtained by reacting 1,4- cyclohexanedimethanol, maleic anhydride, trimellitic anhydride, and ortho-phthalic anhydride.

19. The coating composition of claim 4 wherein said condensation product (I) is obtained by reacting 1,4-cyclohexanedimethanol, maleic anhydride, ortho-phthalic anhydride, and tetra-ethylene glycol.

20. The coating composition of claim 4 wherein said condensation product (I) is obtained by reacting 1,4-cyclohexanedimethanol, maleic anhydride, trimellitic anhydride, and dicyclopentadiene.

21. A water-dispersible, heat-curable coating composition comprising in aqueous dispersion:
I. the condensation product obtained by reacting
   (a) 1,4-cyclohexanedimethanol,
   (b) maleic anhydride,
   (c) trimellitic anhydride, and
   (d) dicyclopentadiene;
II. a cross-linking amount of hexamethoxymethylmelamine resin,
III. a compound having a molecular weight of about 650 to 710 represented by the structure:

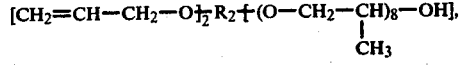

where $R_2$ is a trivalent hydrocarbon radical;
IV. a volatile organic cosolvent,
the weight ratio of said condensation product (I) to said compound (III) being about 5:1 to 9:1, the weight ratio of said condensation product (I) to said cosolvent (IV) being from about 2:1 to 3:1, and said aqueous dispersion of said composition containing by weight about 50% to 60% water.

22. In a method for manufacturing a water-dispersible, heat-curable coating composition of a polyester resin and aminoplast cross-linking resin therefor, wherein said polyester resin is neutralized with an amine neutralizing agent, said neutralized polyester resin dispersed in water, and said aminoplast resin added thereto, the improvement which comprises:
blending with said polyester resin a compound represented by the following structure:

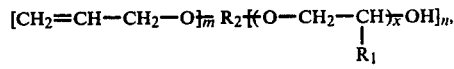

where $R_1$ is hydrogen or a methyl group; and
$R_2$ is a divalent or trivalent hydrocarbon group and
m = 1 or 2
n = 1 or 2
(n)(x) = 1–18, inclusive, or
$R_2$ is a divalent polyoxyalkylene group of the structure

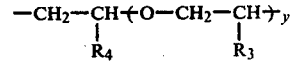

where $R_3$ and $R_4$, independently, are hydrogen or a methyl group,
m = 1
n = 1
x + y = 2–18, inclusive, and
said compound having a molecular weight of up to about 1,200;
the weight ratio of (I) to (III) being from about 0.5:1 to 15:1, provided that when said weight ratio is greater than about 9:1, said composition contains substantially no volatile organic cosolvent.

* * * * *

UNITED STATES PATENT AND TRADEMARK OFFICE
CERTIFICATE OF CORRECTION

PATENT NO. : 4,156,667
DATED : May 29, 1979
INVENTOR(S) : Edward T. Turpin

It is certified that error appears in the above-identified patent and that said Letters Patent are hereby corrected as shown below:

Column 1, line 12, between "relates" and "water", add the word --to--;
lines 12 and 13, delete "thinnable".
Column 4, line 21, delete "-" between "1" and "propenol".
Column 10, Example 10, indent the columns, in the charts.
Column 11, Example 11, first chart, Sample No. "1" is missing.

Signed and Sealed this

Sixteenth Day of October 1979

[SEAL]

Attest:

RUTH C. MASON
Attesting Officer

LUTRELLE F. PARKER
Acting Commissioner of Patents and Trademarks